United States Patent [19]

Yancer

[11] Patent Number: 5,630,607

[45] Date of Patent: May 20, 1997

[54] SUSPENSION SYSTEM FOR VEHICLE FRAME

[76] Inventor: Thomas D. Yancer, 155 S. Fir St., Chandler, Ariz. 85226

[21] Appl. No.: 516,491

[22] Filed: Aug. 17, 1995

[51] Int. Cl.$^6$ .................................................. B62D 21/11
[52] U.S. Cl. ......................... 280/489; 280/788; 280/688
[58] Field of Search ................................ 280/788, 787, 280/781, 784, 688, 724, 725, 489, 483, 400

[56] References Cited

U.S. PATENT DOCUMENTS

| | | | |
|---|---|---|---|
| 1,877,126 | 9/1932 | Greer | 280/483 |
| 2,005,838 | 6/1935 | Bartlett | 280/788 |
| 2,248,921 | 7/1941 | Casner | 280/788 |
| 2,370,866 | 3/1945 | Lewis | 280/400 |
| 2,460,725 | 2/1949 | Armington | 280/489 |
| 2,939,721 | 6/1960 | Smith et al. | 280/788 |
| 3,448,993 | 6/1969 | Gorge et al. | 280/788 |
| 3,547,426 | 12/1970 | Hart et al. | 280/489 |
| 4,466,633 | 8/1984 | Henley | 280/724 |

FOREIGN PATENT DOCUMENTS

| | | | |
|---|---|---|---|
| 2225481 | 1/1973 | Germany | 280/784 |
| 577385 | 5/1958 | Italy | 280/788 |

*Primary Examiner*—Brian L. Johnson
*Assistant Examiner*—Peter C. English
*Attorney, Agent, or Firm*—Tod R. Nissle, P.C.

[57] ABSTRACT

An improved vehicle suspension system compensates for flexure of the frame of the vehicle by permitting the front and rear frame structures to pivot with respect to one another. The pivoting of the front and rear structures is controlled to maintain the structures above the ground and to dampen the pivoting movement of the structures when the structures attempt to move away from a selected orientation with respect to one another.

7 Claims, 5 Drawing Sheets

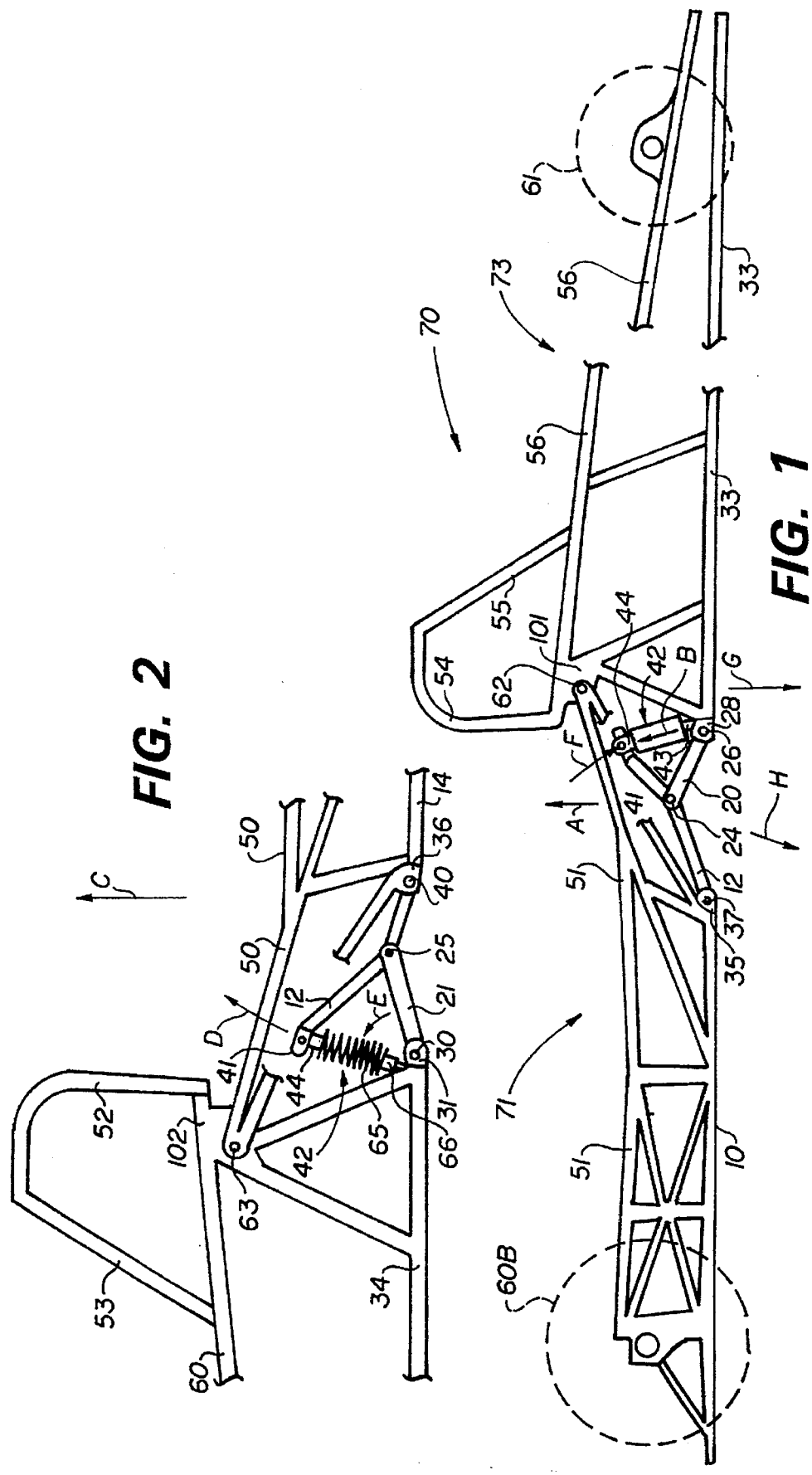

5,630,607

SUSPENSION SYSTEM FOR VEHICLE FRAME

BACKGROUND OF THE INVENTION

1. Field of the Invention

This invention relates to a suspension system for a vehicle.

More particularly, the invention relates to a suspension system which compensates for flexing of the frame of the vehicle and which significantly reduces fatigue in and extends the useful life of the vehicle frame.

When a vehicle accelerates or decelerates, a flexure force is generated which typically causes the frame of the vehicle to bow with respect to the ground. Since the frame of the vehicle is substantially rigid, such repeated bowing flexures of the vehicle cause the metal which comprises the vehicle frame to fatigue. This effect is particularly noticeable in dragsters. Due to the "bowing" fatigue which occurs during flexure, the life of a dragster frame is often a year or less.

2. Description of the Prior Art

Most dragsters utilize a substantially rigid frame and have no suspension in the front and rear of the vehicle. Instead of a suspension system, a dragster relies on the flexure or resilient bending of the frame during acceleration of the dragster. Standard spring type suspension systems have been attempted in the rear of a dragster but have been unsuccessful because the wheel base of the dragster is too long. Similarly, the suspension system utilized on Indy race cars (cars which race during the annual Indianapolis 500 race) has been tried on the front of a dragster. Such Indy suspension systems have not been successful because the front of the dragster does not have sufficient weight to keep the front tires of the dragster on the track. In addition, the high rate of speed of a dragster does not give an Indy suspension system sufficient time to react and work.

Accordingly, it would be highly desirable to provide an improved suspension system for a vehicle which would compensate for flexure generated during acceleration and deceleration of the vehicle and which could quickly react and function when the vehicle is accelerating at a high rate of speed.

Therefore, it is a principal object of the invention to provide an improved vehicle suspension system.

A further object of the invention is to provide a vehicle suspension system which permits a vehicle frame to bow or flex while reducing the fatigue experienced by the frame during such flexure.

Another object of the invention is to provide an improved vehicle suspension system which, while minimizing the fatigue experienced by the vehicle frame, dampens and absorbs flexure forces which act on the frame during acceleration and deceleration of the vehicle.

BRIEF DESCRIPTION OF THE DRAWINGS

These and other, further and more specific objects and advantages of the invention will be apparent to those skilled in the art from the following detailed description thereof, taken in conjunction with the drawings, in which:

FIG. 1 is a side view illustrating a dragster having a suspension system constructed in accordance with the principles of the invention;

FIG. 2 is a partial back side view of the suspension system of FIG. 1 illustrating further construction details thereof;

SUMMARY OF THE INVENTION

Figure 3:
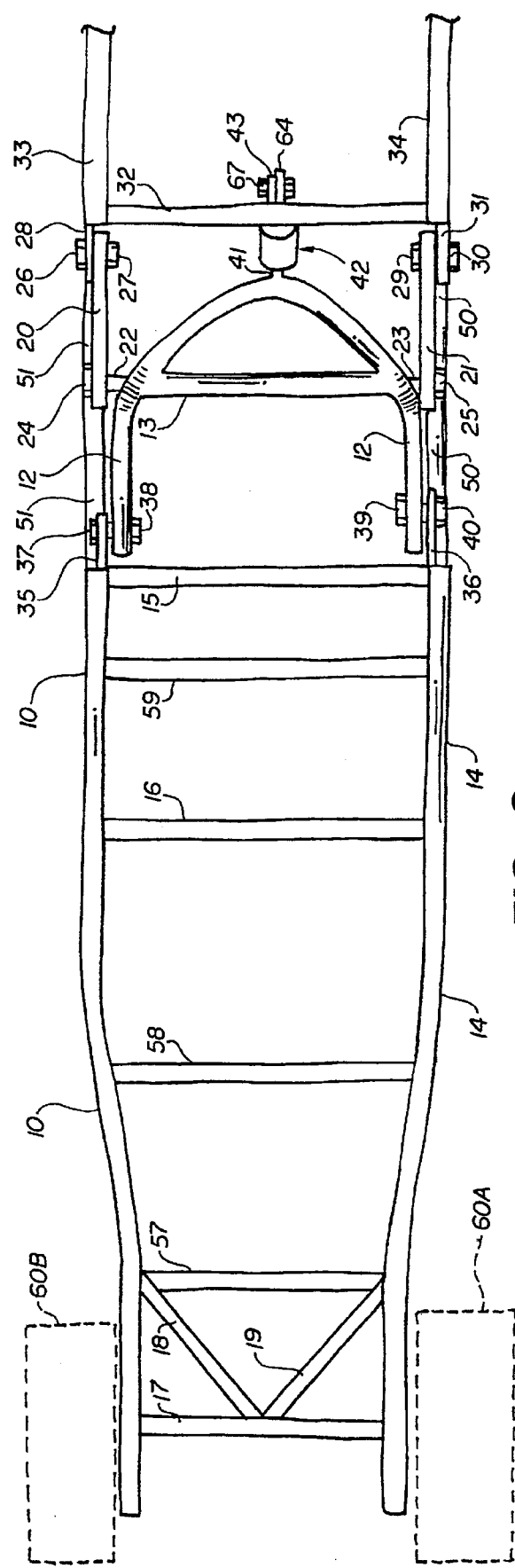
FIG. 3 is bottom view illustrating the dragster of FIG. 1.

Briefly, in accordance with my invention, I provide an improved suspension system for a vehicle. The vehicle has a frame including a front structure spaced above the ground; at least one wheel mounted on the front structure; a rear structure spaced above the ground; and, at least two wheels mounted on the rear structure. The improved suspension system compensates for frame flexure and includes a mechanism for connecting the front structure and the rear structure at at least one pivot point such that front and rear structure can turn about the pivot point; and, a resilient spring connected to the vehicle frame to prevent the force of gravity from causing the front structure and rear structure to rotate about the pivot point such that the front and rear structures contact the ground while the vehicle frame is stationary. The resilient spring generates forces on the frame which act to lift the pivot point away from the ground such that the front and rear structures are spaced above the ground.

In another embodiment of the invention, I provide an improved suspension system for a vehicle. The vehicle has a frame including a front structure spaced above the ground; at least one wheel mounted on the front structure; a rear structure spaced above the ground; and, at least two wheels mounted on the rear structure. The improved suspension system compensates for frame flexure and includes a mechanism for connecting the front structure and the rear structure at at least one pivot point such that front and rear structure can turn about the pivot point; and, a shock absorber for damping the movement of the front and rear structures when the front and rear structures are displaced away from the ground and pivot about the pivot point.

DESCRIPTION OF THE PREFERRED EMBODIMENTS

Turning now to the drawings, which depict the presently preferred embodiments of the invention for the purpose of illustrating the practice thereof and not by way of limitation, and in which like reference characters refer to corresponding elements throughout the several views, FIGS. 1 to 4 illustrate a dragster 70 equipped with a suspension system constructed in accordance with the principles of the invention. The dragster includes a substantially rigid front frame structure 73 spaced above the ground. At least one wheel 61 is mounted on the front frame structure 73. The substantially rigid rear frame structure 71 is spaced above the ground and carries at least a pair of spaced apart wheels 60A and 60B.

Figure 4:
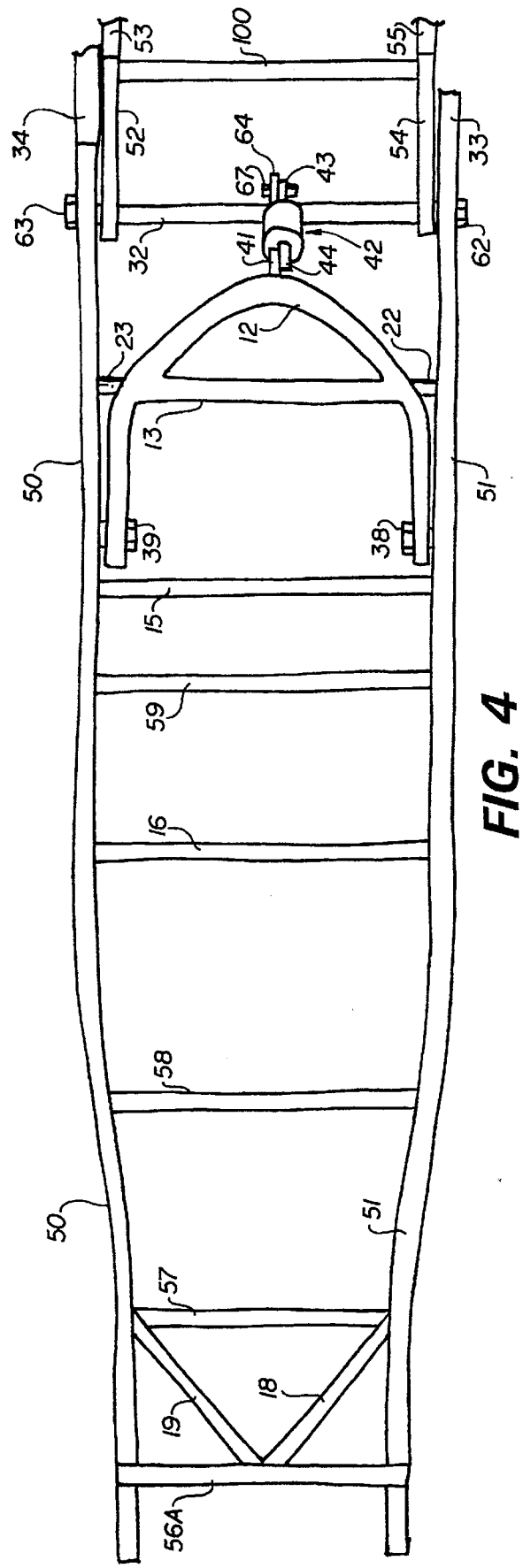
FIG. 4 is a top view illustrating the dragster of FIG. 1.

The rear frame structure 71 is typically constructed from steel or aluminum rods or members and includes a pair of substantially parallel elongate bottom members 10, 14. Members 17, 16, and 15 are fixedly attached to and interconnect members 10, 14. Members 18 and 19 are fixedly attached to and anchor member 17 to members 10 and 14, respectively. Structure 71 also includes a pair of substantially parallel elongate upper members 50 and 51. Members 56A, 57, 58, 59 are fixedly attached to and interconnect members 50 and 51. As shown in FIG. 1, a plurality of vertically oriented support members are used to interconnect and space apart members 10 and 51 and members 14 and 50. In FIGS. 1, 3 and 4, member 51 is positioned directly above member 10. Similarly, as indicated in FIG. 2, member 50 is positioned directly above member 14.

The front frame structure 73 is, like the rear frame structure, typically comprised of steel or aluminum members and includes a pair of elongate bottom members 33, 34, and a pair of elongate upper members 56, 60. Members 52 to 55 are mounted on members 56 and 60 to define a protective cage for the driver of the dragster. Cross brace 100 extends between and is fixedly attached to members 52 and 54. Cross brace 32 extends between and is fixedly attached to members 33 and 34. A plurality of vertically oriented members are used to interconnect and space apart members 33 and 56 and members 34 and 60. In FIGS. 1, 3 and 4, member 56 is directly above member 33. Similarly, as indicated in FIG. 2, member 60 is directly above member 34.

The shape and dimension of the rear frame structure 71 and front frame structure 73 can vary as desired to carry tires, a motor, driver, etc. It is only required that, as is the case for most vehicles, the structures 71 and 73 be substantially rigid so that structures 71 and 73 can carry a selected amount of weight (the motor, transmission, fuel, driver, etc.) and, when wheels 60 and 61 are mounted on the structures 71 and 73, remain spaced above the ground.

The rear frame structure 71 is pivotally attached to the front frame structure by bolts 62 and 63. Bolt 62 passes through member 51 into a flange 101 fixedly secured to member 56. Bolt 63 passes through member 50 into a flange 102 fixedly secured to member 60. If U-shaped member 12, cross bar 13, members 20 and 21, and spring—shock absorber unit 42 were removed from the dragster of FIGS. 1 to 4, then the front 73 and rear 71 frame structures would pivot about bolts 62 and 63 under the force of gravity and fall onto the ground. As described below, however, members 12, 20, 21, bar 13, and unit 42 are secured to the front or rear frame structures 71, 73 and function to maintain structures 71 and 73 off of and spaced apart from the ground.

U-shaped member 12 is pivotally secured to flanges 35 and 36 by bolts 38 and 39. Nut 37 is turned onto bolt 38. Nut 40 is turned onto bolt 39. Flange 35 is fixedly secured to member 10. Flange 36 is fixedly secured to member 14. Cross brace 13 strengthens member 12.

One end of elongate member 21 is pivotally secured to member 12 by bolt 25. Externally threaded end 23 of bolt 25 turns into member 12. The other end of member 21 is pivotally secured to flange 31 by bolt 29. Nut 30 is turned onto bolt 29. Flange 31 is fixedly secured to member 34.

One end of elongate member 20 is pivotally secured to member 12 by bolt 24. Externally threaded end 22 of bolt 24 turns into member 12. The other end of member 20 is pivotally secured to flange 28 by bolt 27. Nut 26 is turned onto bolt 27. Flange 28 is fixedly secured to member 33.

Spring—shock absorber unit 42 includes a spring 65 and a shock absorber or damper 66. Flange or end 44 of unit 42 is pivotally secured to flange 41 fixedly attached to member 12. The other end or flange 43 of unit 42 is pivotally secured to flange 64 by bolt 67. Flange 64 is fixedly secured to member 32.

When the dragster 70 is setting stationary on the ground, the force of gravity, indicated by arrow G in FIG. 1, acts to generate forces which work to cause frame structures 71 and 73 to pivot about bolts 62, 63 so that bolts 62 and 63 are displaced downwardly toward the ground. Consequently, the force of gravity also acts to displace flange 41 and the upper part of member 12 near flange 41 in the direction of arrow F, toward the ground. When member 12 pivots about bolts 38 and 39 toward the ground, members 20 and 21 also pivot about bolts 27 and 29, respectively, toward the ground in the direction of arrow H. Such pivoting movements of members 20, 21, and 12 are, however, prevented by spring 65 which generates a force in the direction of arrow B sufficient to offset the gravity generated forces described above and sufficient to maintain the structures 71 and 73 in the orientation shown in FIG. 1 after the motor, driver, transmission, fuel, side panels (to cover the various structural members 50, 51, etc. shown in FIGS. 1 to 4), paint, etc. are loaded on or in the structures 71 and 73 of dragster 70. The force in the direction of arrow B offsets the downward force generated on the structures 71 and 73 by the force of gravity. Spring 65 can be extremely rigid and give very little or not at all, or, spring 65 can be less rigid and permit greater linear contraction and expansion of the spring.

When the dragster 70 accelerates, forces are typically generated on the dragster frame which cause the central portion of the dragster to bow or flex upwardly in the direction of arrows A and C (FIGS. 1 and 2). When the dragster bows upwardly in the direction of arrow A, member 12 and flange 41 are upwardly displaced in a direction, indicated by arrow D, opposite that of arrow F, and, the rear frame structure 71 and front frame structure 73 pivot about bolts 62, 63 such that bolts 62, 63 and the central portion of dragster 70 are displaced upwardly in the direction of arrow A from the position illustrated in FIG. 1. Members 20, 21 pivot in the direction of arrow E. Since spring 65 of unit 42 generates a force in the direction of arrow B, spring 65 ordinarily does not oppose movement of flange 41 in the direction opposite that of arrow F. In contrast, the shock absorber 66 in unit 42 functions to slow and oppose the upward movement of flange 41 in a direction opposite that of arrow F. After the forces which cause the upward flexure of the central portion of the dragster 70 dissipate, the force of gravity G causes bolts 62,63 and the central portion of dragster 70 to move downwardly toward the position shown in FIG. 1.

While dragster 70 is moving over the ground, it is also possible that downward forces which exceed the downward forces generated by the weight of the dragster can be generated to cause bolts 62, 63 and the central portion of the dragster to be downwardly displaced from the position illustrated in FIG. 1. Such a downward displacement is opposed both by spring 65, which is further compressed by such a downward displacement of the central portion of the dragster, and by the shock absorber 66.

In FIGS. 1, 3, and 4, the unit 42 is shown with its outer cylindrical housing in place. In FIG. 2, unit 42 is shown with the outer cylindrical housing removed to expose the spring and shock absorber which comprise the unit. The spring—shock absorber unit 42 is a "coil-over" unit. One supplier of such a unit is Santhuff Machine of Route 2, Box 67C, Sinton, Tex. 78387. The coil-over unit sold by Santhuff Machine is called the MINI BRUTE (Trademark). Koni, a company in Holland, also manufactures and distributes "coil-over" units.

Figure 5:
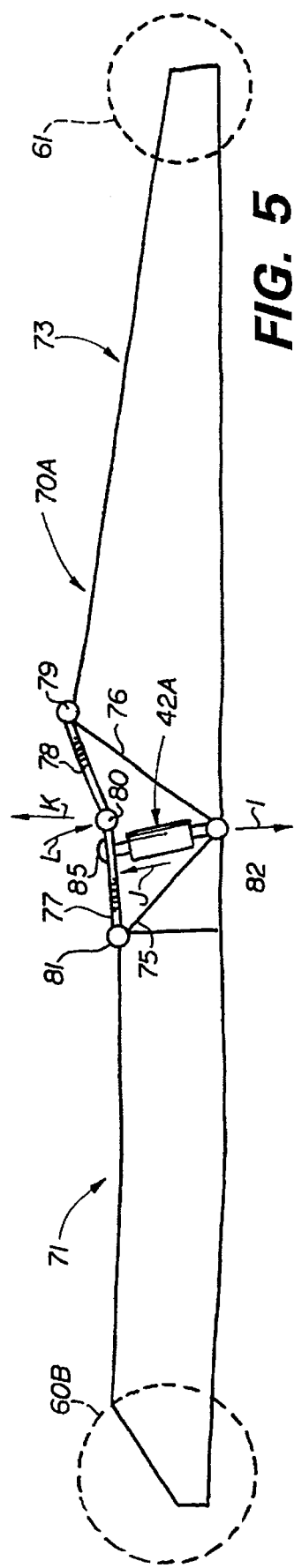
FIG. 5 is a side view illustrating a dragster having an alternate embodiment of the suspension system of the invention.
Figure 6:
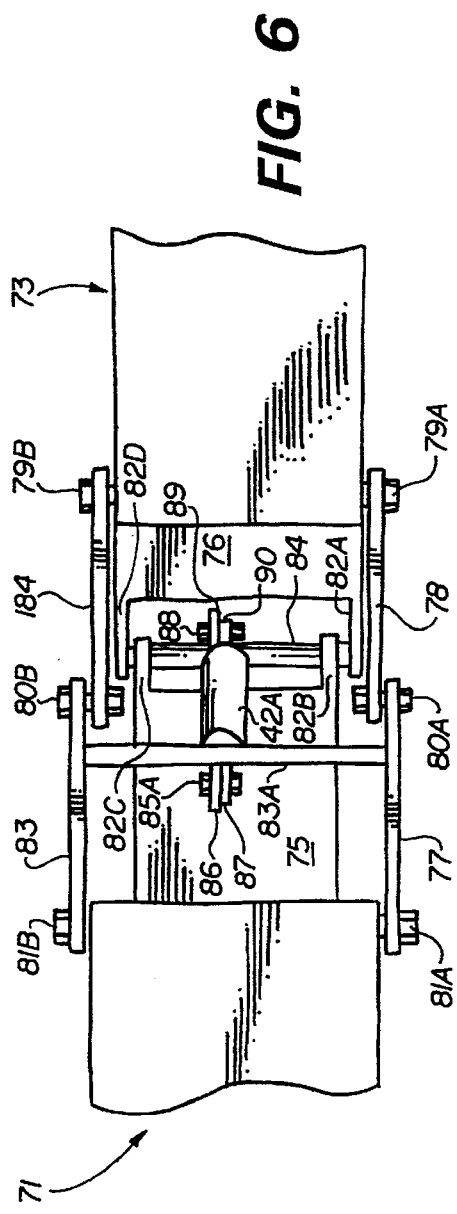
FIG. 6 is a top view illustrating the suspension system of FIG. 5.

FIGS. 5 and 6 illustrate a dragster 70A having an alternate embodiment of the suspension system of the invention. The suspension system utilized to interconnect the rear frame structure 71 and front frame structure 73 of the dragster 70A in FIG. 5 includes a spring—shock absorber unit 42A having depending flanges 90 and 87. Flange 90 is pivotally connected to flange 89 by bolt 88. Flange 89 is fixedly secured to cylindrical shaft 84. Flange 87 is pivotally connected to flange 86 by bolt 85A. Flange 86 is fixedly secured to shaft 83A. Shaft 83A interconnects and is fixedly secured to members 83 and 77. One end of member 83 is pivotally secured to the rear frame structure 71 by bolt 81B. The other end of member 83 is pivotally secured to member 184 by bolt 80B. The other end of member 184 is pivotally secured to the front frame structure 73 by bolt 79B.

One end of member 77 is pivotally secured to the rear frame structure 71 by bolt 81A. The other end of member 77 is pivotally secured to member 78 by bolt 80A. The other end of member 78 is pivotally secured to the front frame structure 73 by bolt 79A.

The front frame structure 73 includes flat canted panel member 76 and includes flanges 82A and 82D which are fixedly secured to structure 73 and are pivotally connected to shaft 84.

The rear frame structure 71 includes flat canted panel member 75 and includes flanges 82C and 82B which are fixedly secured to structure 71 and are pivotally connected to shaft 84.

In sum, the suspension system illustrated in FIGS. 5 and 6 includes the pivoting attachment of structure 71 to structure 73 at shaft 84, includes the unit 42A pivotally attached to shafts 83A (at pivot point 85) and 84, includes member 77 pivotally connected at pivot points 81, 80, includes member 78 pivotally connected at pivot points 80 and 79, includes member 83 pivotally connected at bolts 81B and 80B, and includes member 184 pivotally connected at bolts 80B and 79B.

When the dragster 70A is stationary on the ground, the force of gravity, indicated by arrow I in FIG. 5, acts to generate forces which work to cause flanges 82A to 82D and frame structures 71 and 73 to pivot about cylindrical shaft 84 so that shaft 84 and flanges 82A to 82D will be displaced downwardly toward the ground. Consequently, the force of gravity also acts to displace bolts 80A and 80B in the direction of arrow I, toward the ground (members 77 and 78 are not collinear, but instead are canted with respect to one another so that bolts 80B and 80A are forced toward the ground in the direction of arrow L and are not forced upwardly). Such pivoting movements of members 77, 78 and structures 71 and 73 are, however, prevented by the spring in spring—shock absorber unit 42A. The spring in unit 42A generates a force against shaft 83A in the direction of arrow J sufficient to maintain the structures 71 and 73 in the orientation shown in FIG. 5 after the motor, driver, transmission, fuel, paint, etc. are loaded on or in the structures 71 and 73 of dragster 70A. The force in the direction of arrow J offsets the downward force generated on the structures 71 and 73 by the force of gravity. The spring in unit 42A can be extremely rigid and give very little or not at all, or, the spring can be less rigid and permit greater linear contraction and expansion of the spring.

When the dragster 70A accelerates, forces are typically generated on the dragster frame which cause the central portion of the dragster to bow or flex upwardly in the direction of arrow K (FIG. 5). When the dragster bows upwardly in the direction of arrow K, bolts 79A and 79B move away from bolts 81A and 81B and cause member 77 to be displaced upwardly away from unit 42A in the general direction of arrow J, and, the rear frame structure 71 and front frame structure 73 pivot about shaft 84 such that shaft 84 and the central portion of dragster 70A are displaced upwardly in the direction of arrow K from the position illustrated in FIG. 5. Since the spring in unit 42A generates a force in the direction of arrow J, the spring ordinarily does not oppose movement of shaft 83A (and members 77 and 83) in the direction of arrow K. In contrast, the shock absorber in unit 42A functions to slow and oppose the upward movement of shaft 83 in the direction of arrow J. After the forces which cause the upward flexure of the central portion of the dragster 70A dissipate, the force of gravity I causes shaft 84 and the central portion of dragster 70A to move downwardly toward the position shown in FIG. 5. FIG. 6 illustrates the central portion of dragster 70A.

While dragster 70A is moving over the ground, it is also possible that downward forces which exceed the downward forces generated by the weight of the dragster can be generated to cause shaft 84 and the central portion of the dragster to be downwardly displaced from the position illustrated in FIG. 5. Such a downward displacement is opposed both by the spring in unit 42A, which is further compressed by such a downward displacement of the central portion of the dragster, and by the shock absorber in unit 42A. The construction of unit 42A is equivalent to the construction of unit 42.

Figure 7:
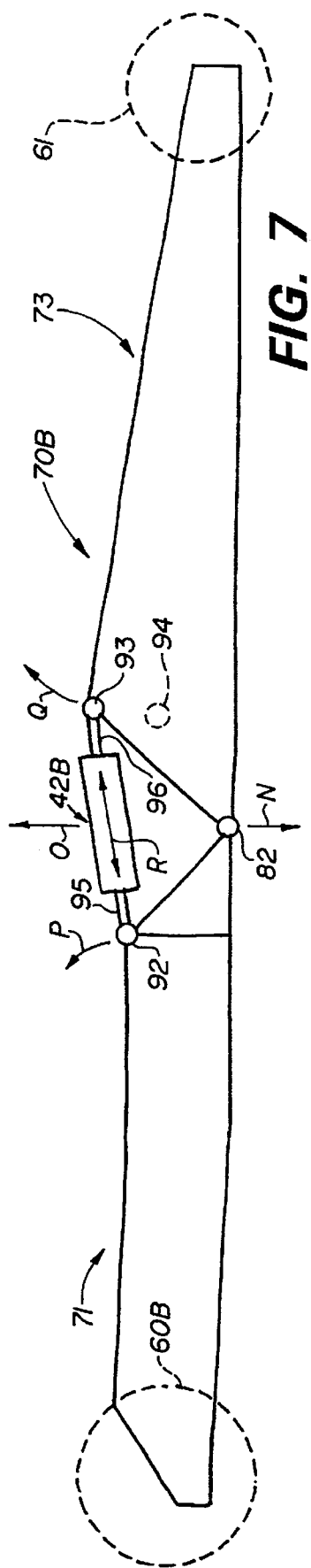
FIG. 7 is a side view illustrating a dragster having still another embodiment of the suspension system of the invention; and, FIG. 8 is a top view further illustrating the suspension system of FIG. 7.
Figure 8:
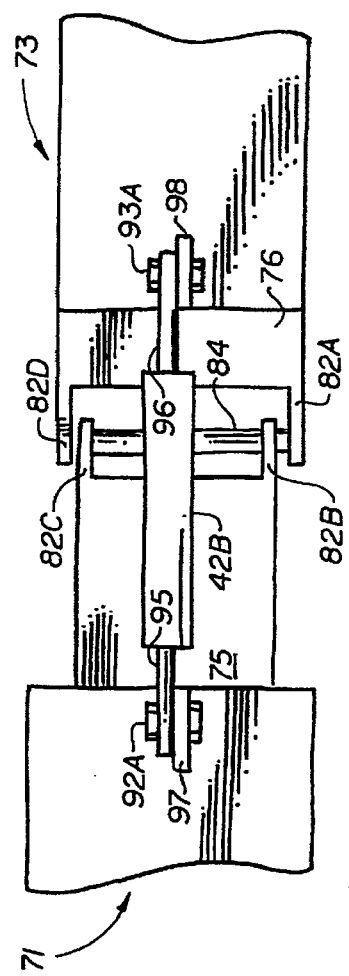

FIGS. 7 and 8 illustrate a dragster 70B having still another embodiment of the suspension system of the invention. The suspension system utilized to interconnect the rear frame structure 71 and front frame structure 73 of the dragster 70B in FIG. 7 includes a spring—shock absorber unit 42B having depending flanges 95 and 96. Flange 95 is pivotally connected to flange 97 by bolt 92A. Flange 97 is fixedly secured to structure 71. Flange 96 is pivotally connected to flange 98 by bolt 93A. Flange 98 is fixedly secured to structure 73.

As was the case with the embodiment of the invention in FIGS. 5 and 6, the front frame structure 73 includes flat canted member 76 and includes flanges 82A and 82D which are fixedly secured to structure 73 and are pivotally connected to shaft 84. The rear frame structure 71 includes flat canted member 75 and includes flanges 82C and 82B which are fixedly secured to structure 71 and are pivotally connected to shaft 84.

In sum, the suspension system illustrated in FIGS. 7 and 8 includes the pivoting attachment of structure 71 to structure 73 at shaft 84, and includes the unit 42B pivotally attached to frames 71 and 73 at pivot points 92 and 93, respectively.

When the dragster 70B is stationary on the ground, the force of gravity, indicated by arrow N in FIG. 7, acts to generate forces which work to cause flanges 82A to 82D and frame structures 71 and 73 to pivot about cylindrical shaft 84 so that shaft 84 and flanges 82A to 82D will be displaced downwardly toward the ground and so that bolts 92A and 93A are displaced downwardly and toward one another. Such pivoting movements of flanges 82A to 82D and such movement of bolts 92A and 93A downwardly toward one another are, however, prevented by the spring in spring—shock absorber unit 42B which generates forces acting against bolts 92A and 93A in the directions indicated by arrows R in FIG. 7. The forces R are sufficient to maintain the structures 71 and 73 in the orientation shown in FIG. 7 after the motor, driver, transmission, fuel, paint, and any other desired loads are mounted on or in the structures 71 and 73 of dragster 70B. The forces acting in the direction of arrows R offset the downward force generated on the structures 71 and 73 by the force of gravity N. The spring in unit 42B can be extremely rigid and give very little or not at all, or, the spring can be less rigid and permit greater linear contraction and expansion of the spring.

When the dragster 70B accelerates, forces are typically generated on the dragster frame which cause the central portion of the dragster to bow or flex upwardly in the direction of arrow O (FIG. 7). When the dragster bows upwardly in the direction of arrow O, bolts 92A and 93A move away from one another in the directions indicated by arrows P and Q, respectively, and, the rear frame structure 71 and front frame structure 73 pivot about shaft 84 such that shaft 84 and the central portion of dragster 70B are displaced upwardly in the direction of arrow O from the position illustrated in FIG. 7. Since the spring in unit 42B generates forces in the directions of arrows R, the spring ordinarily does not oppose movement of bolts 92A and 93A in the directions of arrows P and Q (although it would be possible to provide a unit 42B having a spring which would resiliently oppose movements in the direction of arrows R). In contrast, the shock absorber in unit 42B functions to slow and oppose the outward and upward movement of bolts 92A, 93A (along with flange pairs 95, 97 and 96, 98) in the directions indicated by arrows P and Q, respectively. After the forces which cause the upward flexure of the central portion of the dragster 70B dissipate, the force of gravity N causes shaft 84 and the central portion of dragster 70B to move downwardly toward the position shown in FIG. 7. FIG. 8 illustrates the central portion of dragster 70B.

While dragster 70B is moving over the ground, it is also possible that downward forces which exceed the downward forces generated by the weight of the dragster can be generated to cause shaft 84 and the central portion of the dragster to be downwardly displaced from the position illustrated in FIG. 7. Such a downward displacement is opposed both by the spring in unit 42B, which is further compressed by such a downward displacement of the central portion of the dragster, and by the shock absorber in unit 42B. The construction of unit 42B is equivalent to the construction of units 42 and 42A.

In FIG. 7, flange 96 can, if desired, be pivotally attached to structure 73 at point 94 instead of at pivot point 93.

The basic principles of the suspension system of the invention comprise (1) connecting the front and rear sections or structures of a vehicle at at least one primary pivot point and (2) utilizing a resilient spring means and/or shock absorber to control the movement of the front and rear sections about the primary pivot point. The spring means is sufficiently rigid to ensure that the front and rear sections of the vehicle cannot turn about the primary pivot point a sufficient amount to permit the front and rear sections to contact the ground. If desired, the spring means may be very rigid so that any pivoting movement of the front and rear sections toward the ground from a selected position or orientation is prohibited because the spring means will not compress or give. For example, in FIG. 5, the spring in unit 42A may be sufficiently rigid to prevent any movement of front and rear structures in the direction of arrow I, but may still permit flexure of the dragster by permitting pivot point 82 to be displaced upwardly in the direction of arrow K so that member 77 is displaced upwardly away from unit 42A and pivot point 82. Similarly, if only a shock absorber is utilized in a unit 42A, then movement in the direction of arrow I may be prohibited, with the shock absorber coming into play only when the dragster frame is upwardly displaced in the direction of arrow K. The shock absorber could, if desired, slow the movement of member 77 away from pivot point 82 and also slow the movement of member 77 back toward pivot point 82 after the flexure forces acting on the dragster 70A dissipated.

Having described my invention in such terms as to enable those skilled in the art to understand and practice it, and having identified the presently preferred embodiments thereof,

I claim:

1. In combination with a frame for a vehicle, said frame including:
 a front structure spaced above the ground and including an inner portion and an outer portion,
 at least one ground engaging wheel mounted on said outer portion of said front structure,
 a rear structure spaced above the ground and including an inner portion and an outer portion, and
 at least two ground engaging wheels mounted on said outer portion of said rear structure,
the improvements comprising suspension means to compensate for frame flexure when the vehicle accelerates, said suspension means including
 (a) means for connecting said inner portions of said front structure and said rear structure at at least a primary pivot point (62) such that said front and rear structures can turn about said pivot point;
 (b) linkage means for pivotally interconnecting a first pivot point (37) on said inner portion of said rear structure with a second pivot point (26) on said inner portion of said front structure, said linkage means including at least one link (12) interconnecting said first and second pivot points, said linkage means permitting the distance between said first and second pivot points to alter when said inner portions of said front and rear structures are upwardly displaced away from the ground and pivot about said primary pivot point; and,
 (c) resilient shock absorber and spring means (42) mounted on said vehicle frame to
  (i) maintain said inner portions of said front and rear structures above the ground while the vehicle is stationary,
  (ii) prevent the force of gravity from causing said front structure and rear structure to rotate about said primary, first and second pivot points such that said inner portions of said front and rear structures contact the ground while said vehicle frame is stationary,
  (iii) dampen the movement of said inner portions of said front and rear structures when the vehicle accelerates and said inner portions of said front
 and rear structures are displaced away from the ground and pivot about said primary pivot point;
said resilient shock absorber and spring means including
 (iv) a first end pivotally connected to said linkage means, and
 (v) a second end pivotally connected to said vehicle frame.

2. The combination of claim 1 wherein
 (a) the force of gravity generates a compressive force on said resilient shock absorber and spring means; and,
 (b) a tensile force is generated on said resilient shock absorber and spring means when the vehicle accelerates and upwardly displaces said inner portions away from the ground.

3. In combination with a frame for a vehicle, said frame including:
 a front structure spaced above the ground and including an inner portion and an outer portion,
 at least one ground engaging wheel mounted on said outer portion of said front structure,
 a rear structure spaced above the ground and including an inner portion and an outer portion, and
 at least two ground engaging wheels mounted on said outer portion of said rear structure, the improvements comprising suspension means to compensate for frame flexure when the vehicle accelerates, said suspension means including (a) means for connecting said inner portions of said front structure and said rear structure at a primary pivot point (62) such that said front and rear structures can turn about said pivot point, said primary pivot point being at a selected elevation above the ground when said vehicle frame is stationary;

(b) linkage means for pivotally interconnecting a first pivot point (37) on said inner portion of said rear structure with a second pivot point (26) on said inner portion of said front structure, said linkage means including at least one link interconnecting said first and second pivot points, said linkage means permitting the distance between said first and second pivot points to alter when said inner portions of said front and rear structures are upwardly displaced away from the ground and pivot about said primary pivot point; and, (c) resilient shock absorber means (42) mounted on said vehicle frame to dampen the movement of said inner portions of said front and rear structures when the vehicle accelerates and said front and rear structures are displaced upwardly away from the ground and pivot about said primary pivot point;

said resilient shock absorber means including (i) a first end pivotally connected to said linkage means at a third pivot point (41) separate from said primary, first, and second pivot points, and (ii) a second end pivotally connected to said frame at a fourth pivot point (67), said third pivot point being a selected distance from said fourth pivot point when the vehicle is stationary, said linkage means, when the vehicle accelerates and said inner portions of said front and rear structures are upwardly displaced away from the ground, (iii) pivoting about said first and second pivot points, and, (iv) altering the distance between said third and fourth pivot points, said resilient shock absorber means pivoting about said third and fourth pivot points and dampening the movement of said linkage means when the distance between said third and fourth pivot points is altered.

4. The combination of claim 3 wherein a compressive force is generated on said resilient shock absorber means when the vehicle accelerates and upwardly displaces said inner portions away from the ground.

5. In combination with a frame for a vehicle, said frame including a front structure spaced above the ground and including an inner portion and an outer portion, at least one ground engaging wheel mounted on said outer portion of said front structure, a rear structure spaced above the ground and including an inner portion and an outer portion, and at least two ground engaging wheels mounted on said outer portion of said rear structure, the improvements comprising suspension means to compensate for frame flexure when the vehicle accelerates, said suspension means including (a) means for connecting said inner portions of said front and rear structures at a primary pivot point (62) such that said inner portions of said front and rear structures can turn about said pivot point, said primary pivot point being at a selected elevation above the ground when said vehicle frame is stationary;

(b) linkage means for pivotally interconnecting a first pivot point (37) on said inner portion of said rear structure with a second pivot point (26) on said inner portion of said front structure, said linkage means including at least one lever arm (12) having (i) a first end pivotally attached (37) to at least one of said first and second pivot points, and (ii) a second end, said linkage means permitting the position of said first pivot point with respect to said second pivot point to alter when the vehicle accelerates and said inner portions of said front and rear structures are upwardly displaced away from the ground and pivot about said primary pivot point; and, (c) resilient shock absorber means (42) mounted on said frame to dampen the movement of said front and rear structures when the vehicle accelerates and said inner portions of said front and rear structures are displaced upwardly away from the ground and pivot about said primary pivot point;

said resilient shock absorber means including (i) a first end pivotally connected to said second end of said lever arm at a third pivot point (41) separate from said primary, first, and second pivot points, and (ii) a second end connected to said frame at a fourth pivot point (67), said third pivot point being a selected distance from said fourth pivot point when the vehicle is stationary;

said linkage means, when the vehicle accelerates and said front and rear structures are upwardly displaced away from the ground, generating a force on said resilient shock absorber means which alters the distance between said third pivot point and said fourth pivot point, said resilient shock absorber means dampening the movement of said linkage means when the distance between said third and fourth pivot points is altered.

6. The combination of claim 5 wherein a tensile force is generated on said resilient shock absorber means when the vehicle accelerates and upwardly displaces said inner portions away from the ground.

7. The combination of claim 5 wherein said lever arm includes a pivot point (24) intermediate said first and second ends to pivotally link said lever arm to said frame.

* * * * *